United States Patent [19]
Barnett et al.

[11] Patent Number: 5,540,111
[45] Date of Patent: Jul. 30, 1996

[54] DRIVE APPARATUS AND METHOD

[75] Inventors: Franklin E. Barnett, 4717 Freeport Way, Denver, Colo. 80239; Brian D. Smith, 8863 S. Maplewood Dr., Highlands Ranch, Colo. 80126

[73] Assignees: Franklin E. Barnett, Aurora; Brian D. Smith, Highlands Ranch, both of Colo.

[21] Appl. No.: 317,250

[22] Filed: Oct. 3, 1994

Related U.S. Application Data

[63] Continuation-in-part of Ser. No. 106,831, Aug. 16, 1993, Pat. No. 5,351,566, which is a continuation-in-part of Ser. No. 924,181, filed as PCT/US94/07268, Aug. 3, 1993, Pat. No. 5,236,398.

[51] Int. Cl.$^6$ .......................... F16H 19/04; F16H 55/26; F16H 55/06
[52] U.S. Cl. .................... 74/30; 74/422; 74/465; 280/252; 384/300; 474/152
[58] Field of Search .................... 74/29, 30, 422, 74/465; 280/252, 254; 384/300, 901; 474/152

[56] References Cited

U.S. PATENT DOCUMENTS

| | | | |
|---|---|---|---|
| 494,839 | 4/1893 | Berry | 74/166 |
| 537,982 | 4/1895 | Keys | 74/30 |
| 592,023 | 10/1897 | Schmit | 74/30 |
| 608,241 | 8/1898 | Wilburn | 74/30 |
| 616,480 | 12/1898 | Mead | 74/30 |
| 669,379 | 3/1901 | Baughman | 74/30 |
| 674,213 | 5/1901 | Oldfield | 74/422 |
| 712,361 | 10/1902 | Clarke | 74/30 |
| 719,595 | 2/1903 | Huss | 74/29 X |
| 727,189 | 5/1903 | Nysewander | 74/422 X |
| 817,369 | 4/1906 | Hames | 74/30 |
| 986,561 | 3/1911 | Gard | 74/30 |
| 1,142,964 | 6/1915 | Howe | 74/29 |
| 1,273,693 | 7/1918 | Tucker | 280/241 |
| 1,316,437 | 9/1919 | Flood | 74/30 |
| 1,687,744 | 10/1928 | Webb | 74/30 |
| 1,885,298 | 11/1932 | Schell | 74/30 |
| 1,917,201 | 7/1933 | Bornstein | 74/31 |
| 2,509,161 | 5/1950 | Meyers | 74/422 |
| 2,704,234 | 3/1955 | Love et al. | 384/300 X |
| 2,821,861 | 2/1958 | Dunn | 74/30 |
| 3,309,110 | 3/1967 | Bulmer | 280/242 |
| 3,666,292 | 5/1972 | Bartos | 280/242 |
| 3,854,418 | 12/1974 | Bertin | 74/422 X |
| 3,877,725 | 4/1975 | Barroza | 280/242 |
| 3,891,235 | 6/1975 | Shelly | 280/252 |
| 3,994,509 | 11/1976 | Schaeffer | 280/242 WC |
| 4,063,747 | 12/1977 | Young | 280/255 |

(List continued on next page.)

FOREIGN PATENT DOCUMENTS

| | | |
|---|---|---|
| 1203272 | 7/1959 | France . |
| 1939096 | 2/1971 | Germany . |
| 3306613 | 9/1984 | Germany . |
| 4015491 | 11/1991 | Germany . |
| 662320 | 9/1987 | Switzerland . |

*Primary Examiner*—Allan D. Herrmann
*Attorney, Agent, or Firm*—Brian D. Smith

[57] ABSTRACT

Drive apparatus and method for converting linear motion to rotary motion and vice versa are disclosed. The drive apparatus includes a rack having a plurality of spaced first engagement members arranged single file in a first path and a sprocket having a plurality of spaced second engagement members arranged single file in a second path. The rack's engagement members engage the sprocket's engagement members to rotatingly drive the sprocket when the rack is driven and drive the rack when the sprocket is driven. In addition, either the rack's engagement members or the sprocket's engagement members have outer surfaces which are defined by a member selected from the group consisting of cylindrical bearings and reduced friction material. To operate the apparatus to drive a sprocket, a downstroke is made with the rack to move it as far as it can be moved in a first predetermined direction which rotates the sprocket in a desired clockwise or counter-clockwise direction. An upstroke is then made with the rack to move it as far as it can be moved in a generally opposite second predetermined direction which continues rotation of the sprocket in the desired direction.

24 Claims, 13 Drawing Sheets

U.S. PATENT DOCUMENTS

| | | | |
|---|---|---|---|
| 4,066,356 | 1/1978 | Parker | 74/422 X |
| 4,274,651 | 6/1981 | Dumont | 820/242 WC |
| 4,395,977 | 8/1983 | Pahis | 123/197.4 |
| 4,453,729 | 6/1984 | Lucken | 280/242 WC |
| 4,608,951 | 9/1986 | White | 74/33 X |
| 4,652,026 | 3/1987 | Byrge | 280/242 |
| 4,690,177 | 9/1987 | Gehring et al. | 74/422 X |
| 4,762,332 | 8/1988 | Seol | 280/242 |
| 4,803,964 | 2/1989 | Kurek et al. | 74/30 |
| 4,864,976 | 9/1989 | Falero | 123/197 R |
| 4,865,344 | 9/1989 | Romero, Sr. et al. | 280/242 |
| 4,928,986 | 5/1990 | Carpender | 280/234 |
| 4,998,442 | 3/1991 | Brown et al. | 74/465 X |
| 5,007,655 | 4/1991 | Hanna | 280/250.1 |
| 5,056,475 | 10/1991 | Park | 123/54.1 |
| 5,062,394 | 11/1991 | Belford | 123/55.5 |
| 5,255,572 | 10/1993 | Pickens | 74/465 X |

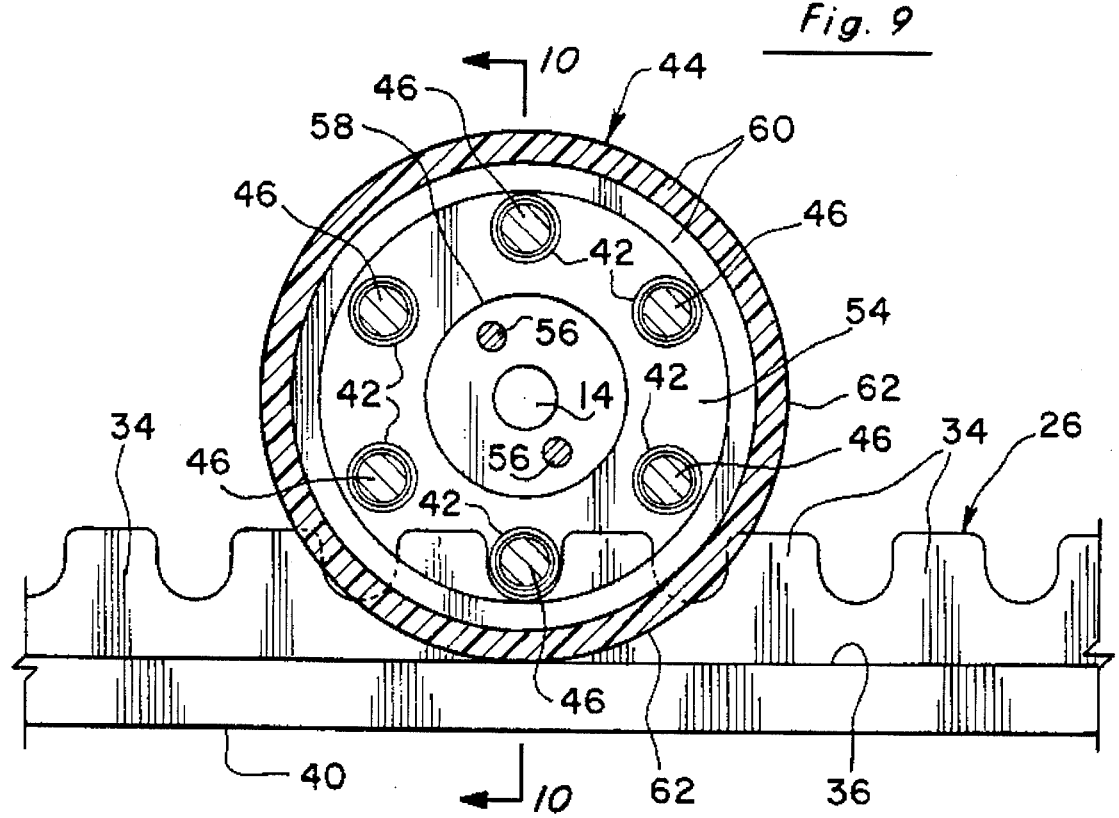
Fig. 9
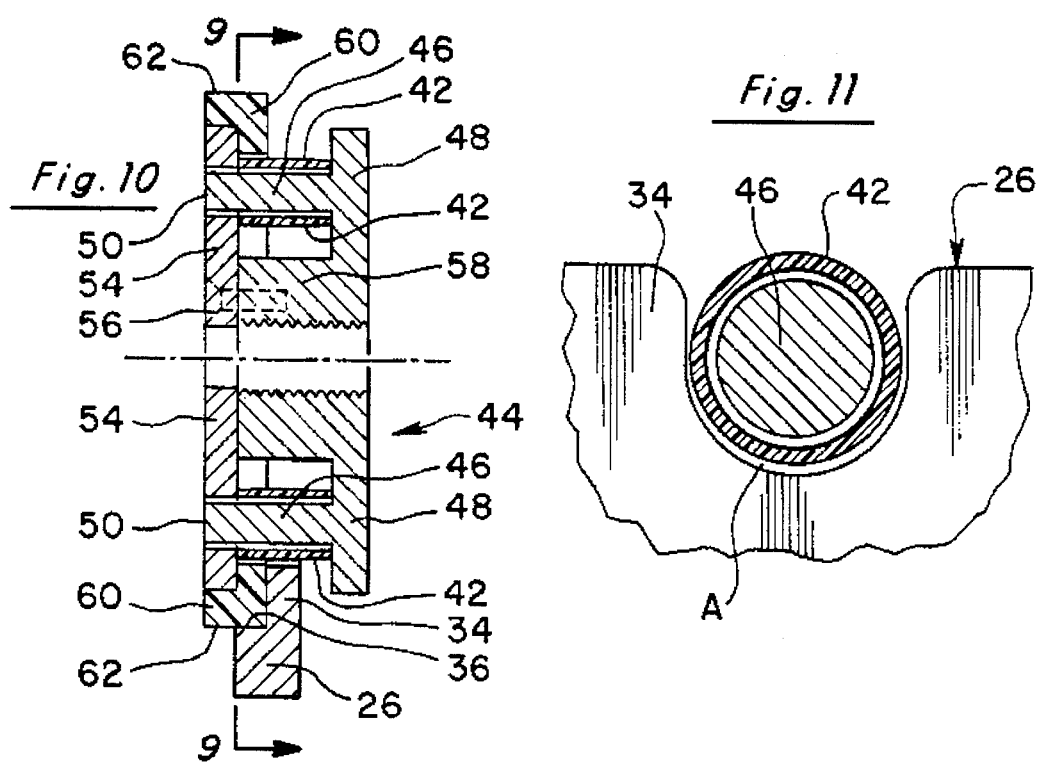
Fig. 10
Fig. 11

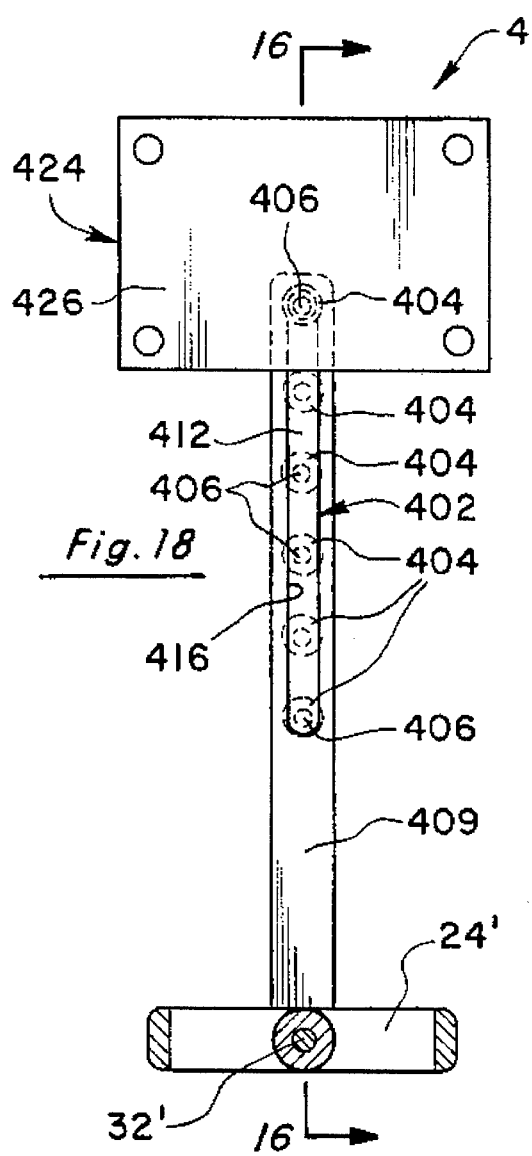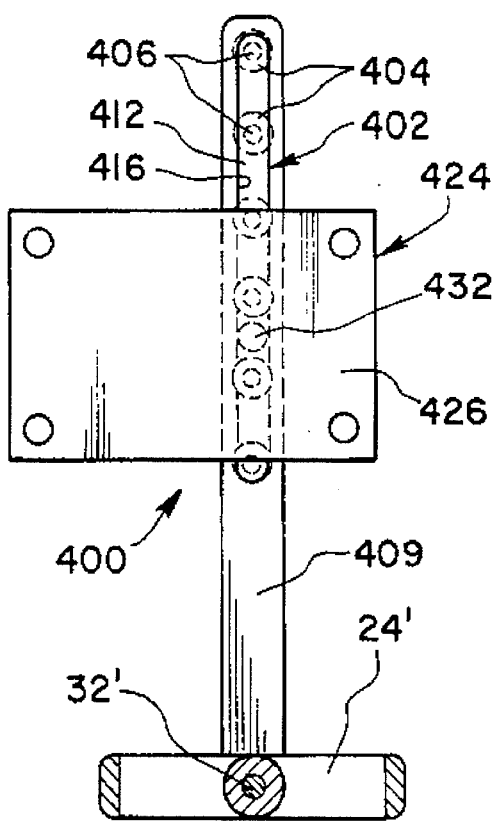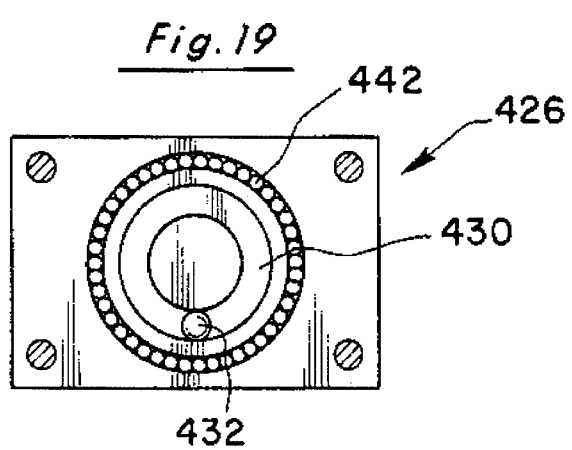

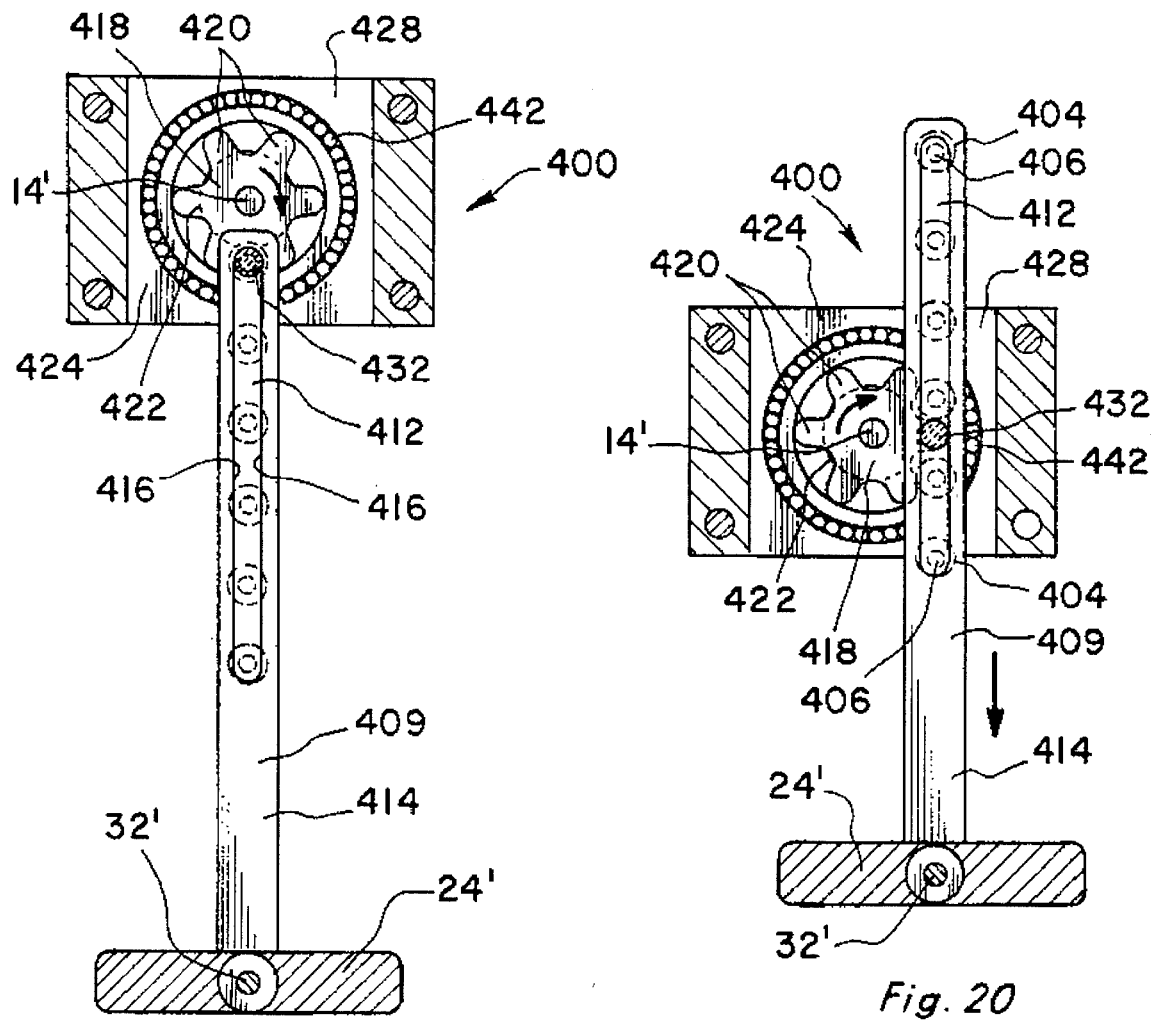
Fig. 21
Fig. 20
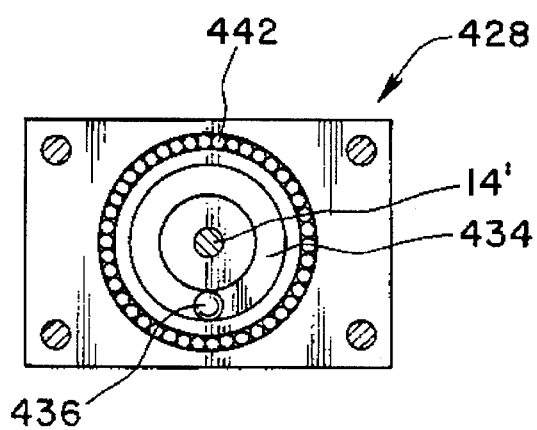
Fig. 22

DRIVE APPARATUS AND METHOD

This application is a continuation-in-part of application Ser. No. 106,831, filed Aug. 16, 1993, now U.S. Pat. No. 5,351,566, which is a continuation-in-part of application Ser. No. 924,181, filed Aug. 3, 1992, now U.S. Pat. No. 5,236,398, both of which are hereby incorporated by reference. This application is also a continuation-in-part of PCT application No. PCT/US94/07268, filed Aug. 3, 1993 which is hereby incorporated by reference and which claims a priority date of Aug. 3, 1992 based on the aforesaid '398 U.S. patent.

TECHNICAL FIELD

The invention relates generally to method and apparatus for driving shafts and axles which may drive or be driven by chains, belts, cables and the like and, more specifically, to a method and apparatus for driving bicycles and motor vehicles powered by internal combustion engines.

BACKGROUND OF THE INVENTION

As is known, the pedal of a conventional bicycle follows an arcuate path as it revolves about the axis of the bicycle's main sprocket. One problem with generating power along a curved or arcuate path is that the portion of the path over which maximum power is generated is very short. In a conventional bicycle, maximum power is generated during that portion of the pedal's path which travels from about +45° from the horizontal to about −30° from the horizontal. As can be visualized, it is difficult to generate significant power outside this portion of the pedal's path since the operator's foot is simply not at an angle with respect to the pedal which enables the generation of much power.

The connecting rod/crankshaft attached to the piston of an internal combustion engine suffers from the same problem as that present in a conventional bicycle since the mechanics of the combination are no different than that provided by the bicyclist leg/pedal combination.

The prior art is replete with apparatus attempting to solve the aforementioned problem and other related problems. Examples of such apparatus which disclose apparatus for driving wheel chairs, bicycles, compressors and the drive shaft of a piston driven internal combustion engine are disclosed in U.S. Pat. Nos. 494,839; 537,982; 592,023; 669,379; 712,361; 1,273,693; 1,316,437; 1,687,744; 1,885,298; 1,917,201; 2,821,861; 3,309,110; 3,666,292; 3,877,725; 3,891,235; 3,994,509; 4,063,747; 4,274,651; 4,395,977; 4,453,729; 4,608,951; 4,652,026; 4,762,332; 4,803,964; 4,864,976; 4,865,344; 4,928,986; 5,007,655; 5,056,475 and 5,062,394; German Patent Nos. 1,939,096, 3,306,613 and 4,015,491; French Patent No. 1,203,272; and Swiss Patent No. 662,320.

While several of the above patents, particularly U.S. Pat. Nos. 712,361 to Clarke; 4,395,977 to Pahis and 4,608,951 to White, disclose apparatus that appear to be capable of transmitting linearly generated power, i.e. power which is generated by power strokes traveling along a straight line or path, none disclose any apparatus which is believed to be capable of functioning in a practical sense i.e. it would appear that none of the disclosed apparatus is capable of functioning for any extended period of time without breaking down.

DISCLOSURE OF THE INVENTION

The present invention addresses the aforementioned problems by providing method and apparatus for converting linear motion to rotary motion and vice versa. The invention theoretically maximizes the amount of power that can be generated by an individual with the stroke of an arm or leg since power generation can be maximized if the stroke is linear, i.e. along a straight line, as opposed to moving through an arc. As such, the drive apparatus of the present invention is ideally suited for use with apparatus that are powered by an individual with his arms or legs. Some examples of suitable apparatus are bicycles and wheelchairs.

It has also been determined that the drive apparatus of the present invention more efficiently transmits the power of a linear piston stroke to rotary motion than the conventional connecting rod/crankshaft system and, as such, is ideally suited for use in an internal combustion engine.

In its broadest sense, the drive apparatus of the present invention includes a rack (also referred to herein as rack means) having a plurality of spaced first engagement members which are arranged single file in a first path. The drive apparatus also includes a sprocket (also referred to herein as a sprocket means) having a plurality of spaced second engagement members arranged single file in a second path for engaging the first engagement members of the rack to rotatingly drive the sprocket if the rack is driven or drive the rack if the sprocket is driven. In addition, to reduce friction between the engagement members, either the rack's or the sprocket's engagement members (or both) are provided with an outer surface defined by reduced friction material or cylindrical bearings such as roller bearings or sleeve bearings. If the sprocket is attached to the axle or drive shaft of a bicycle or motor vehicle and the like, the sprocket, when driven, would propel the bicycle or motor vehicle.

The apparatus also preferably includes means for maintaining a predetermined degree of root clearance between the rack's and the sprocket's engagement members which facilitates smooth and quiet engagement between the engagement members. The preferred means for maintaining root clearance includes a guide surface defined by the rack which is parallel to the first path followed by the rack's engagement members. In addition, an endless surface is provided which is parallel to the second path followed by the sprocket's engagement members. The endless surface may be defined by the sprocket itself or the shaft to which the sprocket is attached or a member attached to the sprocket's shaft. In any event, the rack's guide surface and the endless surface guidingly cooperate with each other as the rack's and sprocket's engagement members engage each other to maintain a predetermined degree of root clearance between the engagement members.

In a preferred embodiment of the invention for driving a bicycle, the bicycle's right and left pedals are respectively attached to the racks of a pair of cooperating right and left drive apparatus' as described above which are 180 degrees out of phase with each other. The racks' drive sprockets as described above which are rigidly attached to the bicycle's drive axle. Since the left and right drive apparatus are 180 degrees out of phase, the bicycle's axle can be driven virtually continuously as a bicyclist pedals the right and left pedals.

In another embodiment of the invention, the rack is attached to the piston of an internal combustion engine. The stroke of the piston drives the rack which in turn rotatingly drives the sprocket which is attached to the drive shaft of the engine.

In yet another embodiment of the invention, the sprocket is attached to the shaft of an electric motor which drives the sprocket which in turn drives the rack, thereby converting rotary motion to linear motion. The rack could be attached to anything requiring a linear stroke such as a pump.

The method of the present invention utilizes the apparatus of the present invention to drive an axle or shaft which may be that of a bicycle, motor vehicle or any other similar device. The method includes the step of making a downstroke or upstroke with the rack of the above-described apparatus to move it as far as it can be moved in a first predetermined direction which rotates the sprocket means in a desired clockwise or counter-clockwise direction. An opposite return stroke is then made with the apparatus to move the rack as far as it can be moved in a generally opposite second predetermined direction which continues rotation of the sprocket in the desired direction and which puts the rack in position so that another downstroke or upstroke can be made with the rack to move it in the first predetermined direction again to continue rotation of the sprocket in the desired direction.

As will be appreciated from the following description and accompanying drawings, when a stroke is made to move the rack in the first pre-determined direction, the rack goes through half of a racetrack shape path as such is measured along the longitudinal section of the racetrack shape. When the return stroke is made to move the rack in a generally opposite predetermined direction, the rack goes through the other half of the racetrack-shaped path.

BRIEF DESCRIPTION OF DRAWINGS

The invention will be more readily understood by reference to the accompanying drawings wherein like reference numerals indicate like elements throughout the drawing figures, and in which:

FIG. 9 is a cross-sectional view taken along lines 9—9 of FIG. 10.

FIG. 10 is a cross-sectional view taken along lines 10—10 of FIG. 9.

FIG. 11 is an enlarged partial cross-sectional view of FIG. 10 showing a cylindrical bearing of the sprocket engaging the teeth of the rack.

FIG. 17 is a front elevational view of the drive apparatus shown in FIG. 16 taken along lines 17—17 of FIG. 16, showing the position of the apparatus half-way through a downstroke being made with the apparatus.

FIG. 18 is a front elevational view of the drive apparatus shown in FIG. 16 similar to the view of FIG. 17 but showing the position of the apparatus at the end of a downstroke.

FIG. 19 is a cross-sectional view taken along lines 19—19 of FIG. 16.

FIG. 20 is similar to the cross-sectional view taken along lines 21—21 of FIG. 16 but this view shows the position of the apparatus half-way through a downstroke being made with the apparatus instead of its position at the end of a downstroke as such is shown in FIG. 21.

FIG. 21 is a cross-sectional view taken along lines 21—21 of FIG. 16.

FIG. 22 is a cross-sectional view taken along lines 22—22 of FIG. 16.

DETAILED DESCRIPTION OF THE PREFERRED EMBODIMENTS

Figure 1:
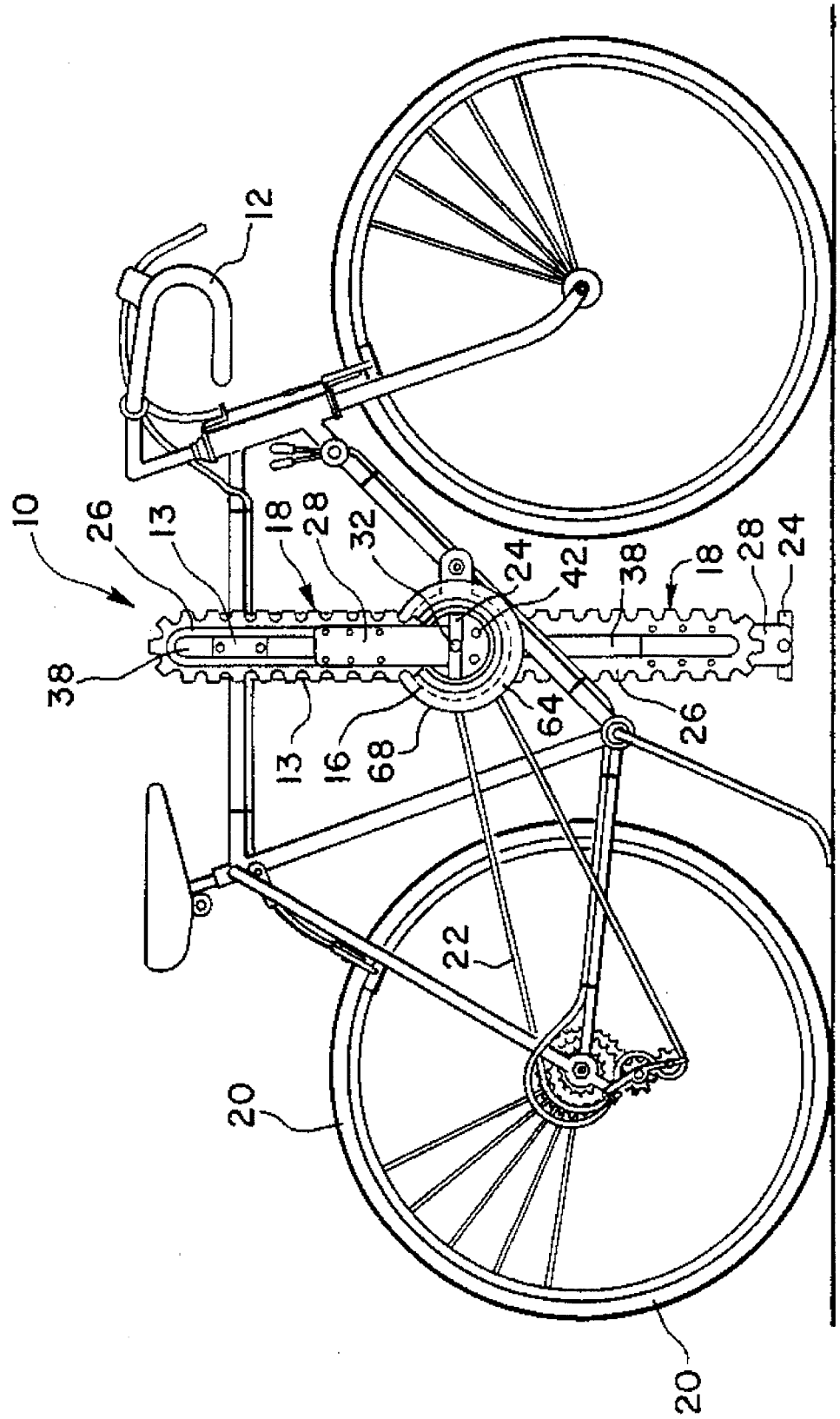
FIG. 1 is a side elevation view of a bicycle equipped with a drive mechanism of the present invention.

FIGS. 1–11 illustrate a bicycle drive mechanism 10 of the present invention for driving a bicycle 12 which is attached to the bicycle's frame by a structure 13. Drive mechanism 10 includes a bicycle drive shaft or axle 14, a central housing 16 and a pair of cooperating right and left drive apparatus' 18 of the present invention which cooperate via axle 14 and housing 16 to rotatingly drive axle 14 which, in turn, drives the bicycle's rear wheel 20 via chain 22, thereby propelling the bicycle. Right and left drive apparatus' 18 are 180 degrees out of phase with each other which enables a bicyclist to drive the bicycles's axle virtually continuously as the bicyclist pedals the bicycle.

Figure 2:
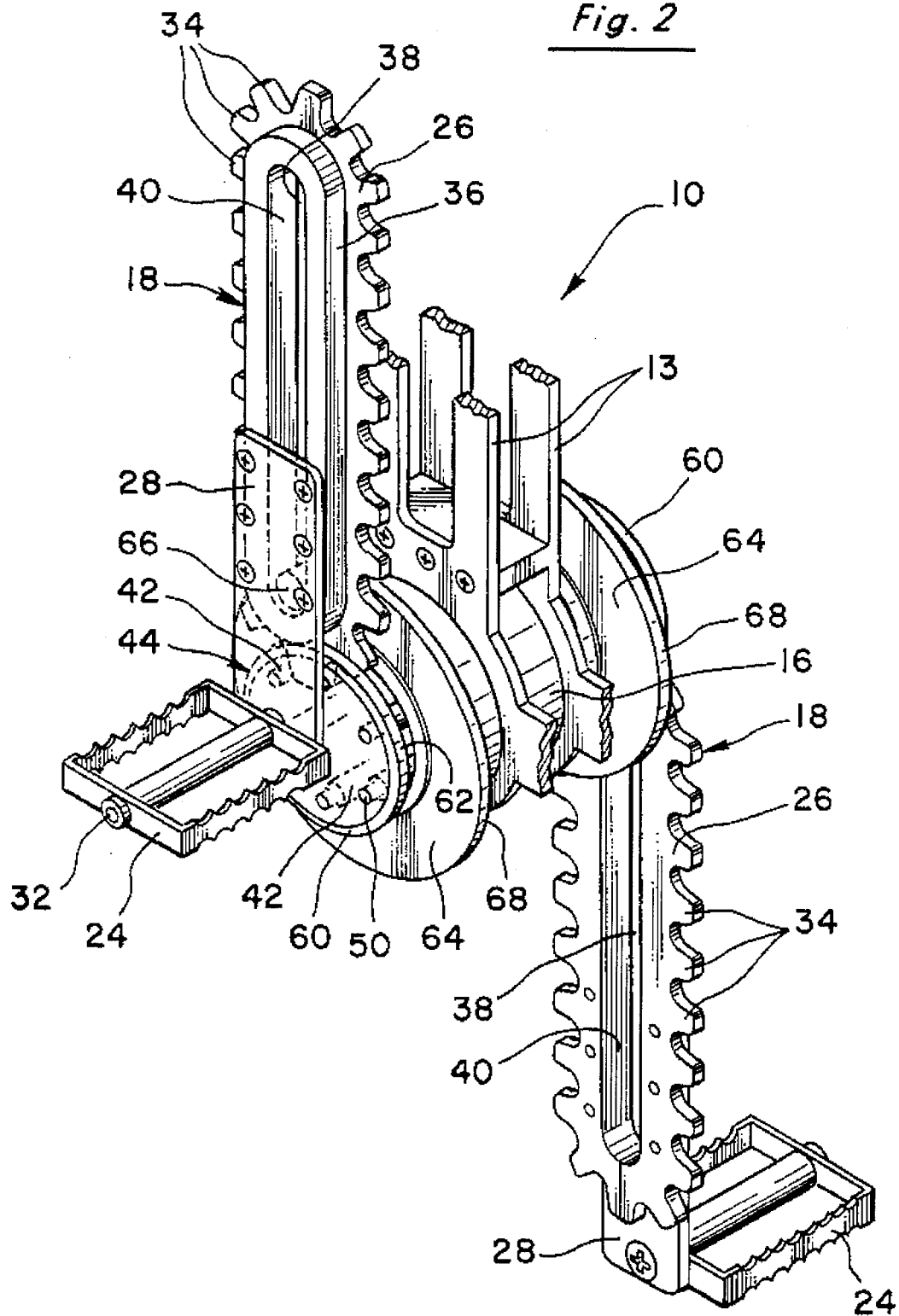
FIG. 2 is a perspective view of the drive mechanism for the bicycle illustrated in FIG. 1.

Left and right drive apparatus 18 each include, as best illustrated in FIG. 2, a pedal 24 which is attached to a rack 26 by a bracket 28 with bolts 30. Pedal 24 is a conventional type pedal in that it has an axle 32 about which it can spin.

Rack 26, as illustrated, has a plurality of outwardly facing, spaced teeth 34 which are arranged single file in a endless racetrack-shaped path. As also illustrated, the racetrack-shaped path of teeth 34 has two parallel linear segments (not numbered) of teeth 34. Rack 26 also defines an outwardly facing endless racetrack-shaped guide surface 36 which is parallel to the endless racetrack-shaped path of teeth 34. Rack 26 further defines a central guide slot 38 having opposing inwardly facing surfaces 40 which are parallel to the parallel linear segments of teeth 34.

Figure 5:
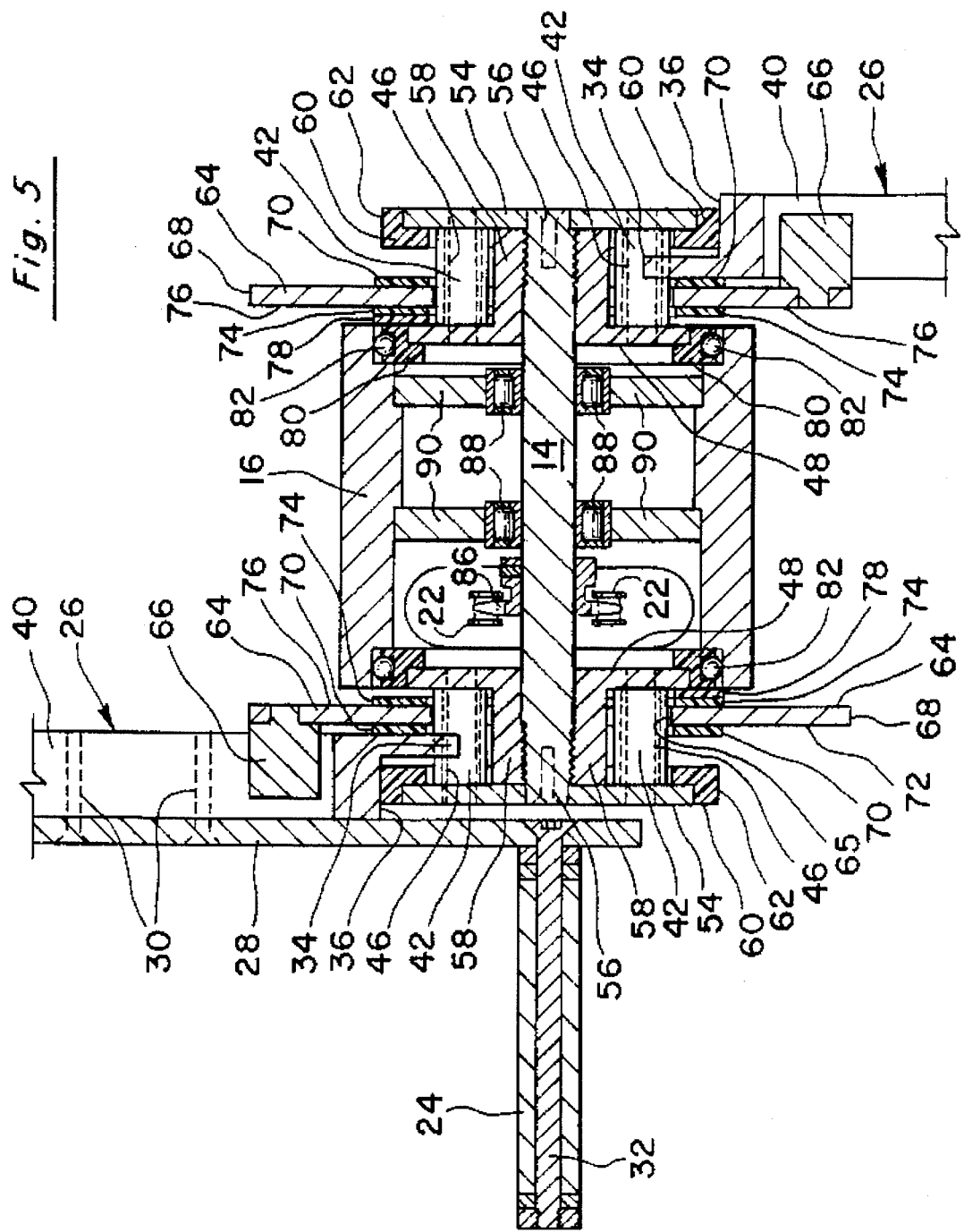
FIG. 5 is a cross-sectional view taken along lines 5—5 of FIG. 4.

As perhaps best illustrated in FIG. 9, teeth 34 of rack 26 engage cylindrical bearings 42 of a sprocket 44 which is rigidly attached to the bicycle's axle 16 by a set screw 45 (See FIG. 5). As such, rack 26 is capable of driving the sprocket and thus the bicycle's axle when a bicyclist pedals the bicycle.

Sprocket 44 is illustrated in detail in FIGS. 7–11. As best illustrated in FIG. 9, bearings 42 of sprocket 44 are equidistantly spaced from each other and arranged single file in an endless circular path about the rotational axis of the sprocket. As best illustrated in FIGS. 8–11, each cylindrical bearing 42, which preferably is a Teflon sleeve bearing, is mounted about a cylindrical post 46 which projects outwardly from a circular back plate 48 of the sprocket. The free ends 50 of the posts are received in bores 52 of a front plate 54 which is rigidly attached to the sprocket with screws 56 which are threaded into a hub 58 of back plate 48 of the sprocket. As such, it will be appreciated that front and back plates 54, 48 securely support posts 46 and prevent bearings 42 from sliding off the posts. In addition, it will be appreciated that bearings 42 are sized, spaced and oriented to rotate in a direction (bearings' axis of rotation is parallel to that of bicycle axle 14) which enables the bearings to engagingly cooperate with teeth 34 of rack 26 to rotatingly drive axle 14 when the rack is driven by a bicyclist pedaling the pedal attached to the rack.

As previously mentioned, cylindrical bearings 42 are preferably Teflon sleeve bearings which are available from Berg Manufacturing Company of Rockaway, N.Y. under the designation "plain style model number MIL-P-19468." While sleeve bearings are preferred, roller bearings could also be utilized in place of sleeve bearings and may be preferable depending on the application. Suitable results may also be attainable depending on the application by simply coating posts 46 with a reduced friction material such as Teflon or Delrin. Delrin is a polyurethane material available from the Polymer Corporation of Reading, Pa.

Figure 8:
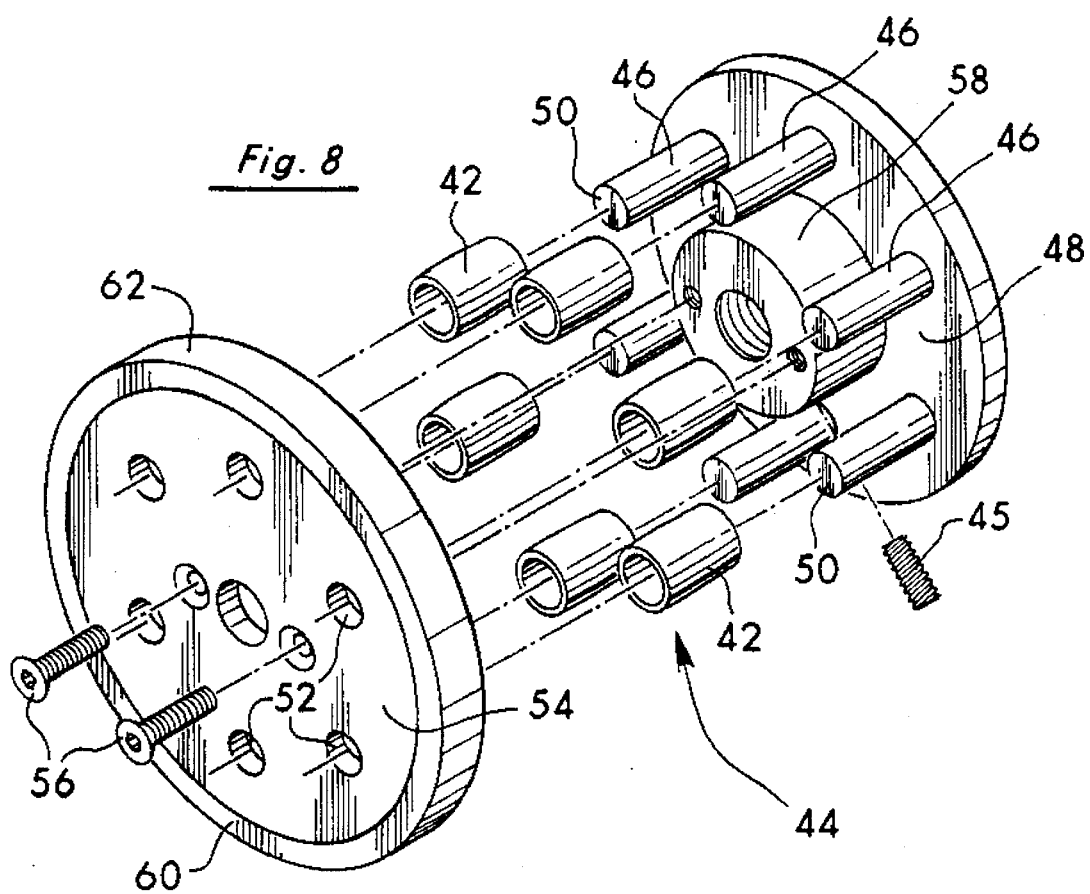
FIG. 8 is an exploded perspective view of the sprocket of FIG. 7.

As best illustrated in FIGS. 8 and 10, sprocket 44 also has a ring-like member 60 mounted about the perimeter of front plate 54 and the rotational axis of the sprocket. Ring-like member 60 defines an endless outwardly facing circular surface 62 which is parallel to (or concentric with) the endless circular path made by bearings 42. Endless circular surface 62 guidingly cooperates with (i.e. it preferably rolls on) the outwardly facing endless racetrack-shaped guide surface 36 of rack 26 to maintain a predetermined degree of root clearance between teeth 34 and bearings 42 as such is illustrated by the letter A in FIG. 11. Maintaining a predetermined degree of root clearance facilitates smooth and quiet engagement between the teeth and bearings.

Figure 3:
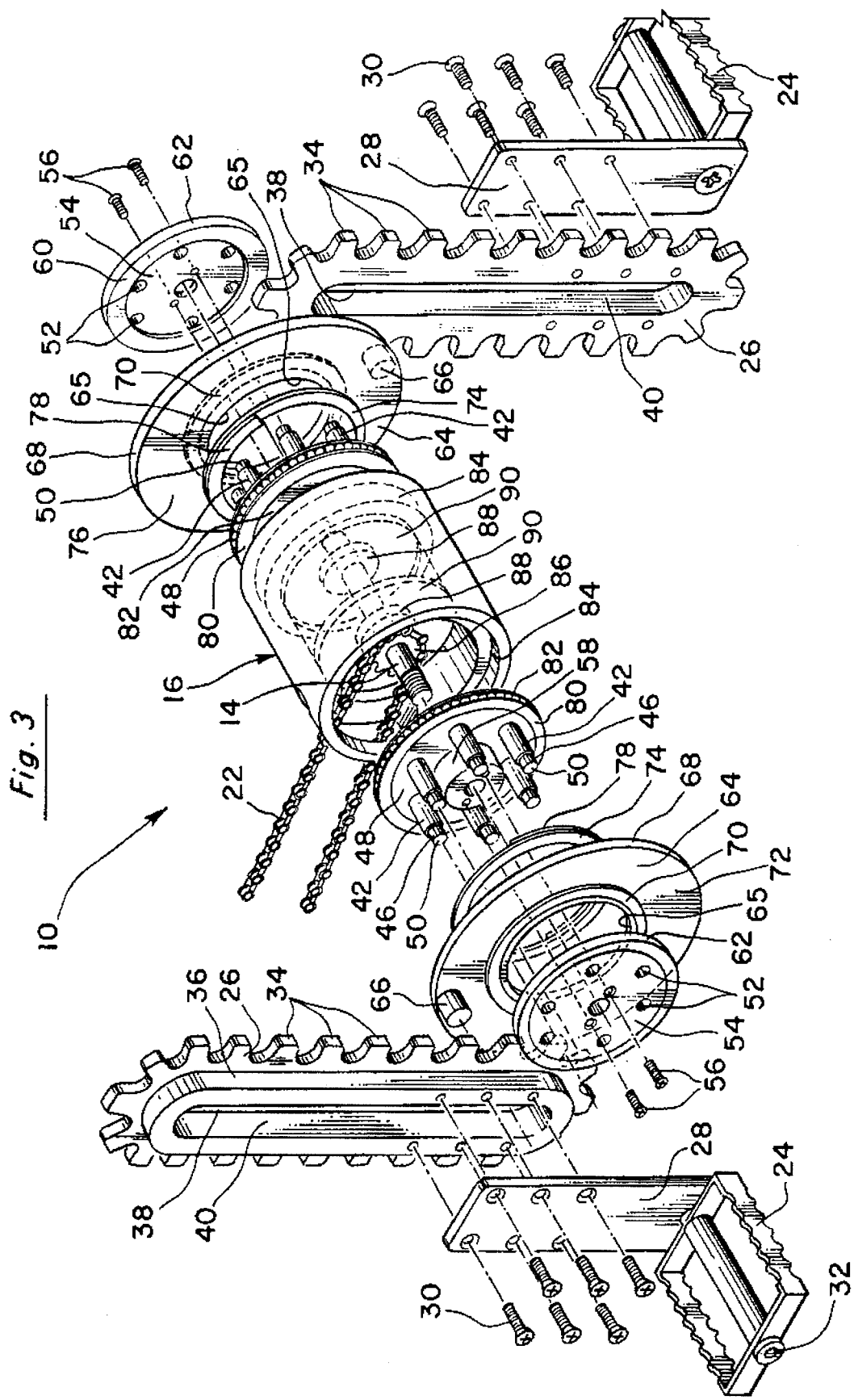
FIG. 3 is an exploded perspective view of the drive mechanism of FIGS. 1 and 2.
Figure 4:
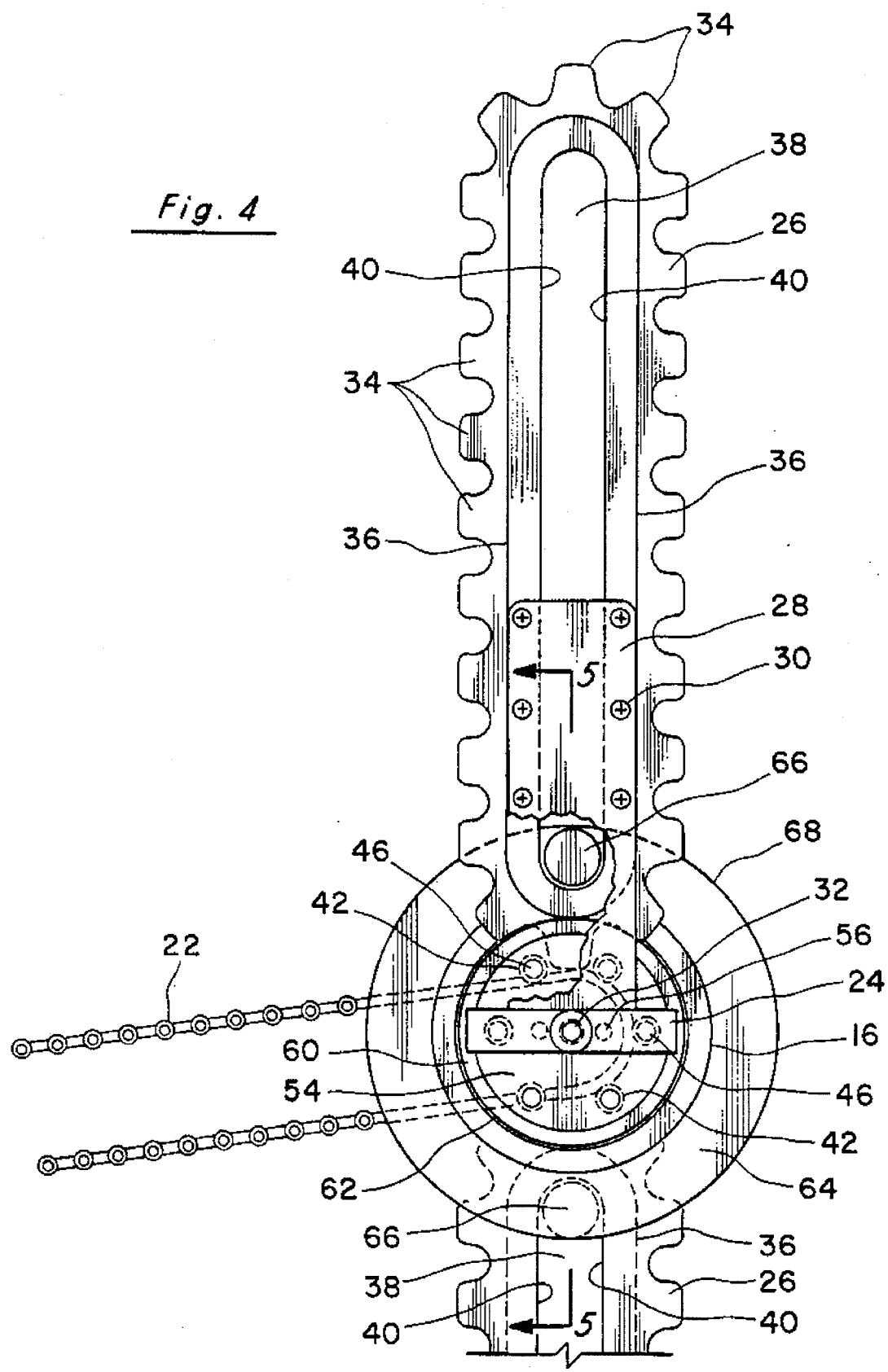
FIG. 4 is an enlarged partial side elevation view of the drive mechanism of FIGS. 1 and 2.
Figure 6:
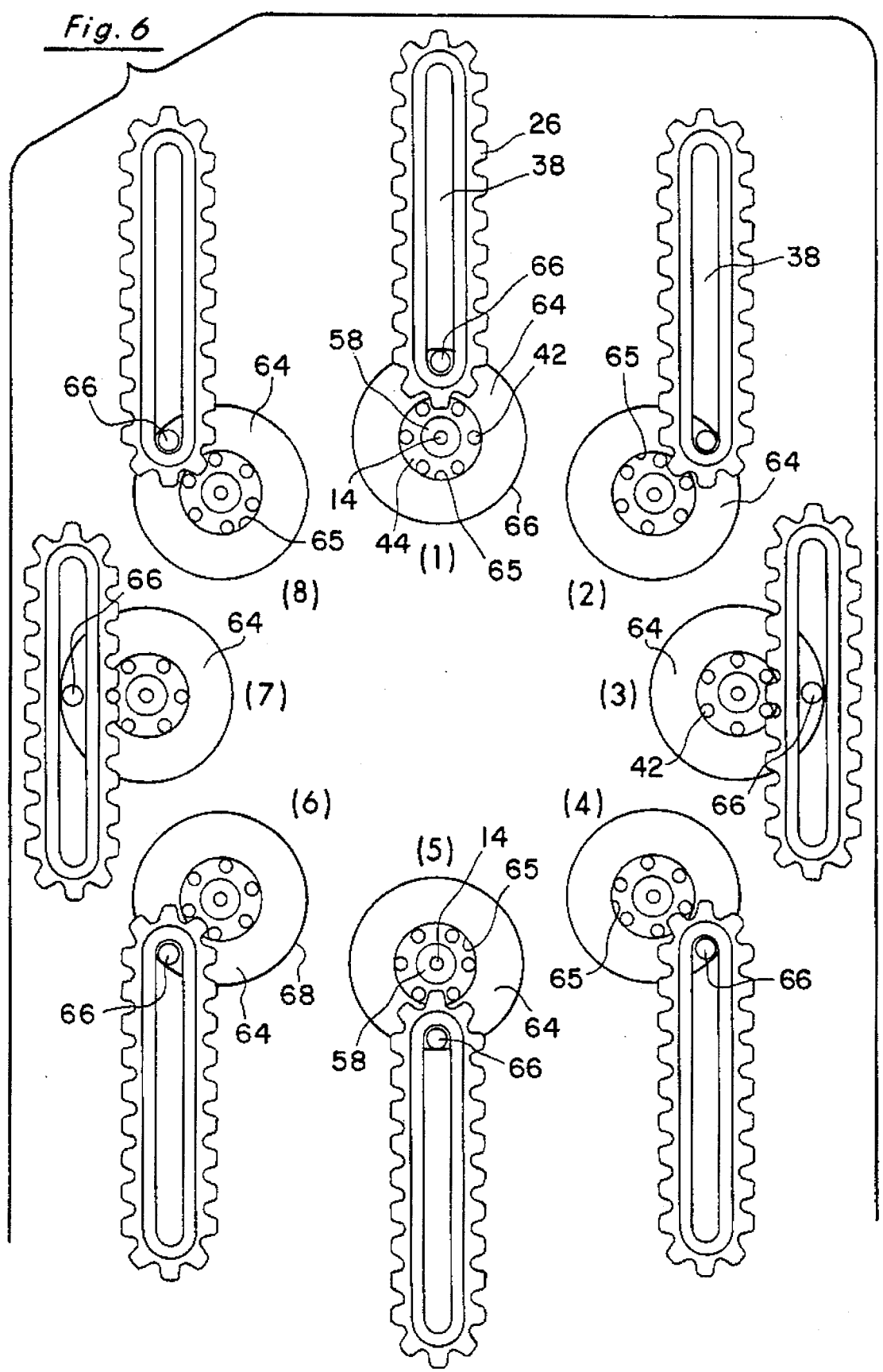
FIG. 6 is a plurality of side elevational views showing the movement of the rack and rotating disc of the drive apparatus of FIGS. 1 through 5 as they cooperate to drive the sprocket of the drive apparatus.
Figure 7:
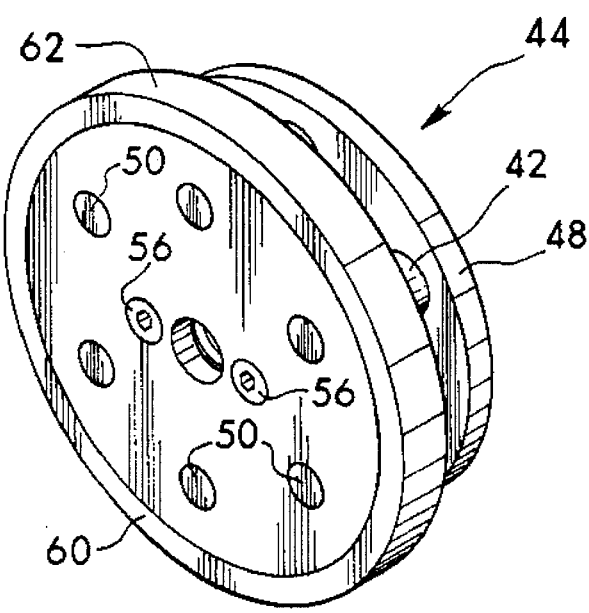
FIG. 7 is a perspective view of the sprocket employed in the drive apparatus of FIGS. 1 through 6.

Each left and right drive apparatus also includes, as best illustrated in FIGS. 3 and 6, a rotatable rack engagement means or disc 64 for maintaining engagement of rack 26 with sprocket 44 as the rack's teeth 34 and sprocket's bearings 42 engagingly cooperate. As best illustrated in FIG. 5 and 6, disc 64 is mounted on bearings 42 of the sprocket via an inner concentric surface 65 defined by disc 64. Thus, it will be appreciated that disc 64 rotates independently about axle 14, not in conjunction with sprocket 44.

Disc 64 also has a rack engaging cylindrical pin means or pin 66 attached to and projecting outwardly from a location adjacent its edge 68. As disc 64 rotates about axle 14, pin 66 revolves about axle 14 in a circular orbit. As also illustrated in FIG. 6, pin 66 is received within the rack's central guide slot 38 so that it moves along the surface of slot 38 as it revolves about axle 14. As will be appreciated, the surface of slot 38 is parallel to the path made by the rack's teeth 34 so that pin 66 can slide along the slot's surface (or roll within the slot) to maintain engagement of rack 26 with sprocket 44 as the rack's teeth and the sprocket's bearings engagingly cooperate to drive axle 14, as such is illustrated in views 1 through 8 of FIG. 6. While not illustrated, pin 66 could be a roller bearing which would reduce friction between the pin and surface of the slot. Pin 66 could also be made from a tough reduced friction material such as Delrin polyurethane.

FIG. 3 further illustrates that a polyurethane ring-shaped spacer 70 is affixed to the outer facing surface 72 of disc 64.

Also illustrated is another polyurethane ring-shaped spacer 74 which is affixed to the inner facing surface 76 of disc 64. Spacer 70 serves to reduce friction between rack 26 and disc 64 while spacer 74 reduces friction between disc 64 and back plate 48 of sprocket 44. FIG. 3 also illustrates that spacer 74 is provided with a half-ring segment 78 opposing pin 66 which rides against back plate 48 and serves to prevent disc 64 from bending inwardly as a bicyclist pedals the apparatus. As with the other polyurethane components of drive apparatus 18, spacers 70, 74 are preferably made from Delrin polyurethane.

FIG. 3 also illustrates that a concentric ring-like member 80 is mounted about the outer edge of back plate 48 of sprocket 44. Ring-like member defines a race (not numbered) for receiving a plurality of ball bearings 82. As will be appreciated, member 80 and bearings 82 fit within a recessed area 84 of housing 16. Ball bearings 82 facilitate the rotation of sprocket 44 relative to housing 16 while housing 16 provides support for sprocket 44 which, in turn, is believed to reduce the moment arm on axle 14 which is generated during pedaling of the apparatus and which can cause bending of axle 14.

FIGS. 3 and 5 illustrate that chain 22 is driven by a conventional sprocket 86 which is rigidly attached to axle 14. A pair of axle bearings 88 for axle 14 are also illustrated which are mounted on supports 90 of housing 16.

As previously mentioned, left and right drive apparatus 18 are 180° out of phase with each other. This means that when a bicyclist completes a downstroke with one of the pedals which puts the pedal at its lowest point, as such can be visualized from view 5 of FIG. 6, the other pedal will be at its highest point, as such can be visualized from view 1 of FIG. 6. Thus, it will be appreciated that the bicyclist can not only pedal the bicycle continuously with the drive apparatus of the present invention, but can also provide power to the bicycle's axle virtually continuously since apparatus 18 enables the bicyclist to make substantially linear downstrokes which enable power generation over almost the entire downstroke as opposed to the arcuate-type downstrokes made with a conventional bicycle which enable power generation over only a short portion of the stroke.

FIG. 6 illustrates the movement of rack 26 and rotating disk 64 which takes place when a bicyclist pedals bicycle 12 illustrated in FIG. 1. View 1 illustrates the position of rack 26 and rotating disk 64 when the pedal is at its highest point and in a position enabling the bicyclist to begin making a downstroke. The pedal is not shown in FIG. 6, however, it will be understood from the other drawings that the pedal is attached by bracket 28 to the lower end of rack 26.

View 2 illustrates the rack's and disc's positions when the bicyclist begins making a downstroke with the apparatus. It will be appreciated that rack 26 has moved slightly to the right, and that pin 66 of rotating disc 64 has moved from its 12:00 noon position illustrated in View 1 to approximately a 1:30 position illustrated in View 2. View 3 illustrates the position of the members when the bicyclist is halfway through a downstroke. As shown, pin 66 is now at a 3:00 position.

While not illustrated in the drawings, pin 66 is typically at or near the 3:00 position during most of the downstroke since vertical downstrokes can not be made with rack 26 until pin 66 is in this position or something near it (between perhaps 1:30 and 4:30) which as will be appreciated is the position pin 66 must be in to allow rack 26 to move vertically downward about pin 66 via the rack's slot 38 to drive sprocket 44.

This does not mean, however, that a bicyclist has to make completely vertical downstrokes with the apparatus. As will appreciated, rack 26 can tilt forward or backwards which allows the bicyclist to lean forward or backwards and still make powerful linear downstrokes. For example, if the bicyclist were riding the bicycle uphill, the bicyclist would probably want to lean forward on the bicycle (due to the force of gravity) which would cause rack 26 to automatically tilt or pivot forward to a position such as perhaps 1:30 with respect to the bicycle (not the hill). As will be appreciated, if the rack is in a 1:30 position, pin 66 will be in a 4:30 position during the downstroke. Similarly, if the bicyclist is riding the bike downhill, it may be desirable to lean back and make downstrokes with the rack tilted slightly backwards which might be at an 11:00 position which would cause pin 66 to move to a 2:00 position. Whatever pedaling angle is desired by the bicyclist, it will be appreciated that apparatus 18 will accommodate this angle by automatically tilting to a position which enables the bicyclist to make the most powerful linear downstrokes that can be made at this angle.

View 4 of FIG. 6 illustrates the members' positions when the bicyclist has substantially completed the downstroke. As shown, pin 66 is now at the top of slot 38. Continued downward pressing on the pedal will cause rotating disc 64 to move from this position to its position illustrated in View 5, which illustrates the members' positions when the downstroke is completed. As shown, pin 66 is now in a 6:00 position.

View 6 illustrates the members' position at the beginning of the return stroke which is powered by pedaling the other pedal of the bicycle which is 180 degrees out of phase with the pedal for the apparatus of FIG. 6. In other words, if the downstroke illustrated in FIG. 6 is made with the right pedal, a downstroke with the left pedal will cause the apparatus illustrated in FIG. 6 to make its return stroke.

View 7 illustrates the members' positions halfway through the return stroke which means that the other pedal is halfway through its downstroke, again, since the pedals are 180° out of phase with each other. View 8 illustrates the members' position near the completion of the return stroke, the completion of which will return the members to the positions illustrates in View 1.

Those skilled in the relevant art will also appreciate that inertia plays a role in moving the members through the positions illustrated in Views 1 and 5, just as the pedals of a conventional bicycle move through these positions when it is pedaled.

In view of the foregoing, it will be appreciated that the bicyclist's foot follows a racetrack-shaped path during pedaling, which is to be distinguished from the circular path a bicyclist's foot goes through in pedaling a conventional bicycle. Those skilled in the art will appreciate that the long linear segments of a racetrack-shaped path enable the bicyclist to generate and transmit much more power to the bicyclist's axle than that which can be transmitted by making a stroke through a circular path.

Figure 12:
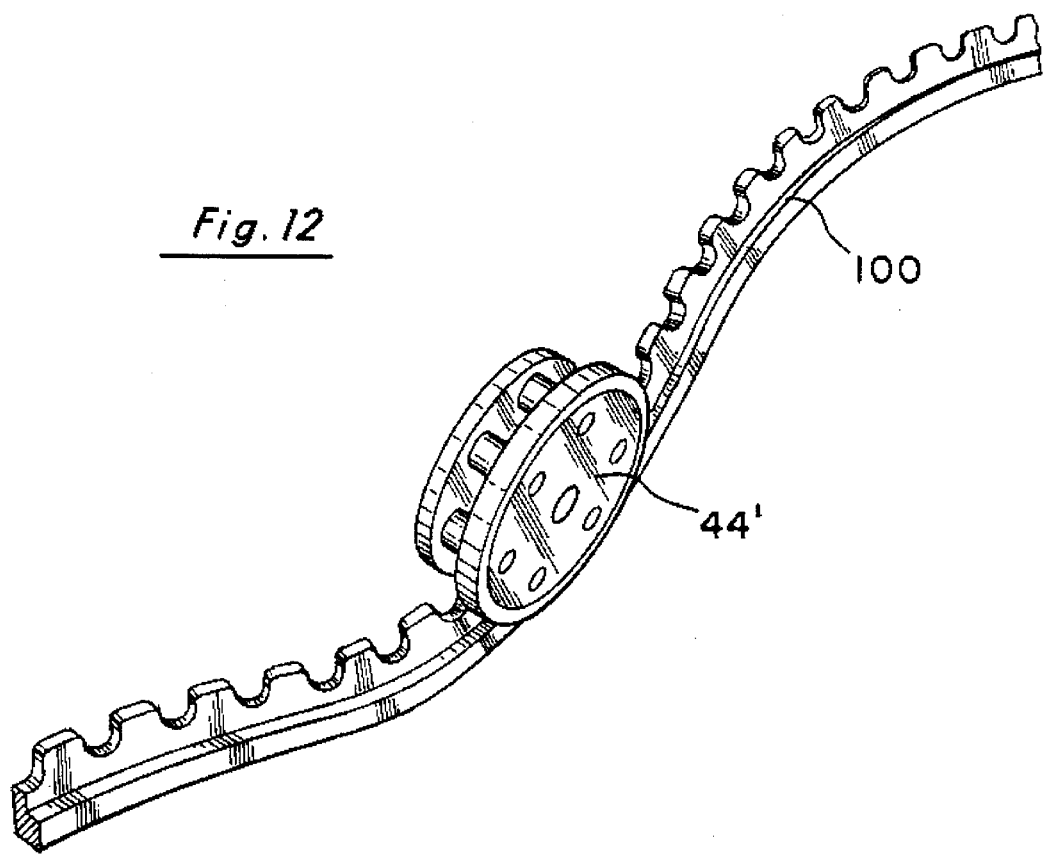
FIG. 12 is a perspective view showing a sprocket of the present invention traveling along a serpentine rack of the present invention.

FIG. 12 illustrates another application of the present invention from which it can be visualized that a sprocket 44' which is substantially identical to that illustrated in FIGS. 1–11, and which could be rigidly attached to the driving axle of any type of vehicle, including a trolley or train, can be driven to propel the vehicle along a serpentine track or rack 100. Those skilled in the art will appreciate that the engagement of the sprocket's bearings with rack's teeth will enable the propulsion of such a vehicle up steep inclines which cannot be climbed by today's trains and other similar vehicles. Those skilled in the relevant art will also appreciate that the drive apparatus of the present invention can be employed to enhance the breaking capability of trains, the use of which would be particularly desirable at railroad crossings.

Figure 13:
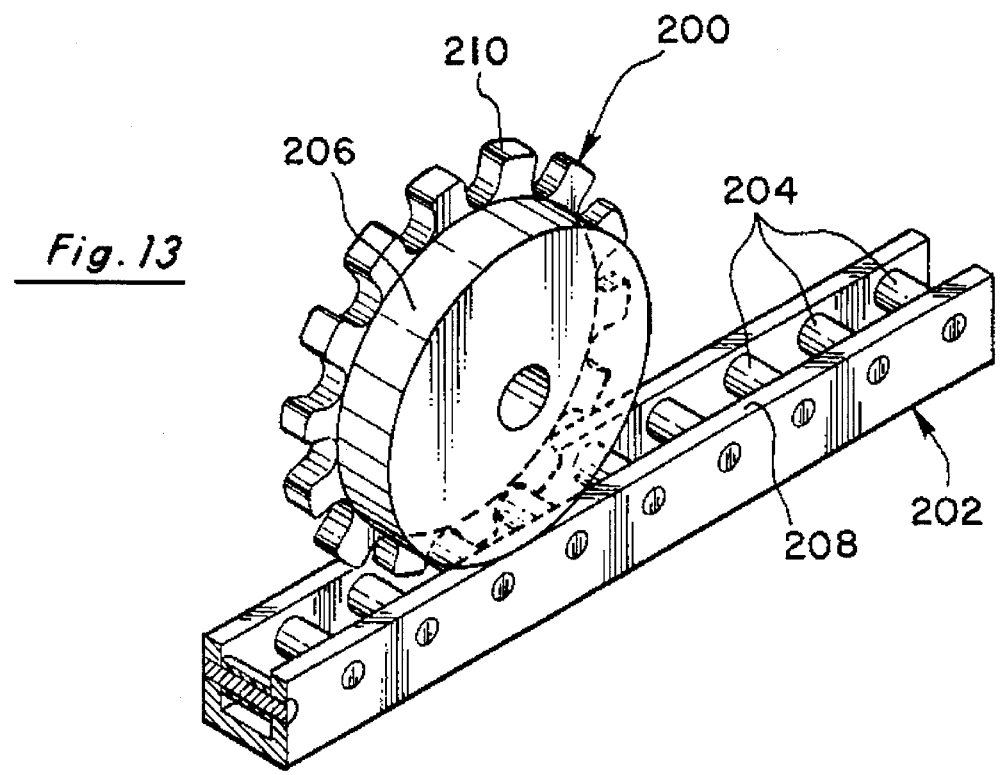
FIG. 13 is a perspective view showing a sprocket of the present invention engaging a rack of the present invention utilizing cylindrical bearings as its engagement members.

FIG. 13 illustrates another embodiment of the drive apparatus of the present invention in which a sprocket 200 is engaging a rack 202 having a plurality of cylindrical bearings 204 such as bearings 42 of the embodiment illustrated in FIGS. 1–11. Sprocket 200 defines a surface 206 which rides on the edge 208 of rack 202 to maintain a predetermined degree of root clearance between the sprocket's teeth 210 and bearings 204 of the rack.

Figure 14:
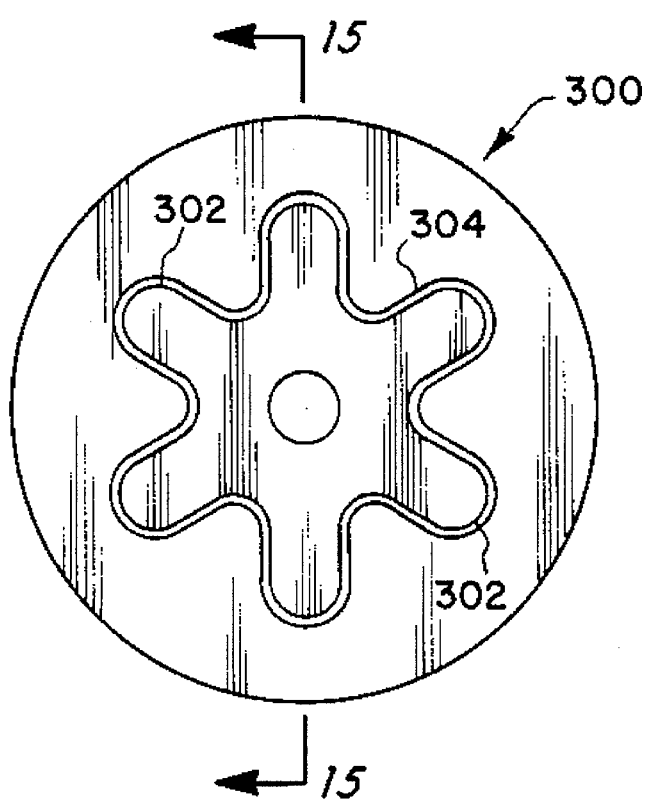
FIG. 14 is side elevational view of another sprocket of the present invention having Teflon coated teeth to reduce friction.
Figure 15:
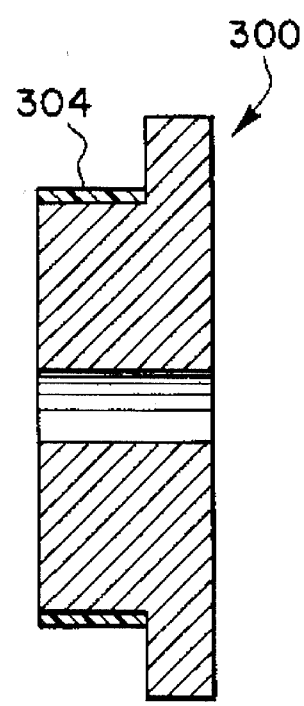
FIG. 15 is a cross-sectional view taken along lines 15—15 of FIG. 14.

FIG. 14 illustrates a sprocket 300 of the present invention which is similar to sprocket 44 employed in FIGS. 1–11, but which differs in that it does not have cylindrical bearings such as bearings 42 of the previous embodiment. Instead, sprocket 300 has arcuate surfaces 302 which have a radius of curvature similar to that of bearings 42, but which, of course, do not rotate. To reduce friction, arcuate surfaces 302 are covered or coated with a layer 304 of reduced friction material such as Teflon, Delrin, or any other material providing reduced friction.

If sprocket 300 were substituted for sprocket 44 in the embodiment illustrated in FIGS. 1–11, it should provide satisfactory results. Although, it is believed that sprocket 44 utilizing Teflon sleeve bearings 42 will provide superior results.

FIGS. 16 through 22 illustrate another drive apparatus embodiment 400 of the present invention for driving a bicycle. Components of this embodiment which are identical to those of the embodiment of FIGS. 1 through 11 are identified by the same numbers except that the numbers of this embodiment are also primed.

Conceptually, the embodiment of FIGS. 16 through 22 is identical to that of FIGS. 1 through 11. However, the components of this embodiment are significantly different. For example, the tooth-like racetrack-shaped rack 26 of the previous embodiment is replaced in this embodiment with a straight roller rack 402 having a plurality i.e. six cylindrical bearings 404 which are arranged linearly but side by side with respect to each other so that all of the bearings' axes of rotation are parallel to each other (See FIGS. 16, 17). Bearings 404 are preferably identical to bearings 42 and as such are preferably Teflon sleeve bearings which are supported on cylindrical posts 406 similar to posts 46. Posts 406 are in turn supported by a pair of parallel inner and outer side plates 408, 409 with are rigidly connected to or integral with the posts' ends (not numbered).

Figure 16:
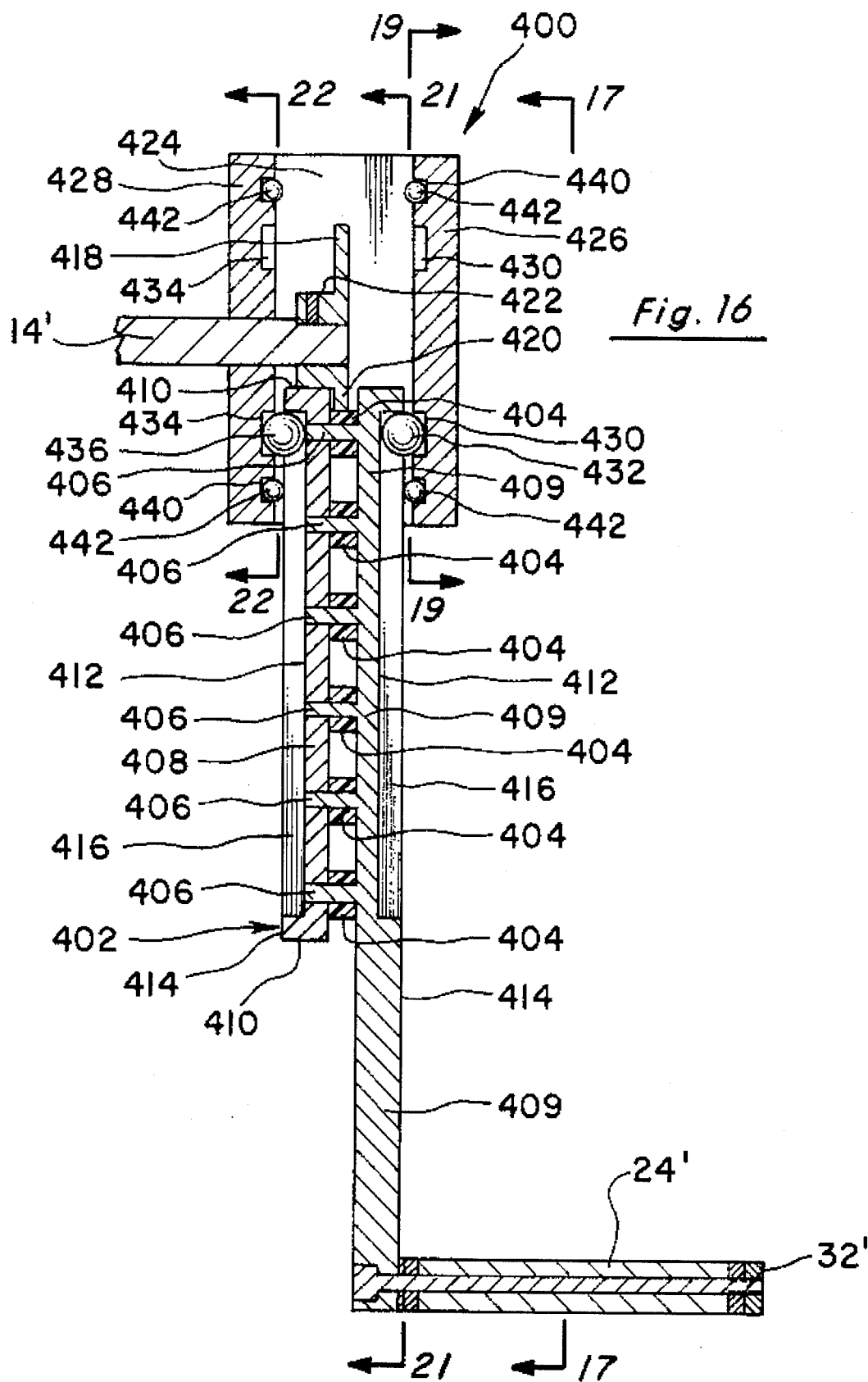
FIG. 16 is a cross-sectional view of another drive apparatus of the present invention taken along lines 16—16 of FIG. 18.

FIG. 16 also illustrates that roller rack 402 is provided with an endless racetrack-shaped surface 410 which is defined by the edge of inner side plate 408. Endless surface 410 provides the same function as endless surface 36 of the previous embodiment i.e. to maintain root clearance as previously described and as described in more detail below. In addition, each side plate 408 defines a groove 412 in its outwardly facing side surface 414. Groove 412 defines a side surface 416 (including opposing inwardly facing parallel surfaces which are not numbered) which provides a function similar to that provided by surface 40 of slot 38 of the previous embodiment.

Sprocket 44 of the previous embodiment is replaced in the embodiment of FIGS. 16 through 22 with a sprocket 418 having a plurality of rounded teeth 420 which engage bearings 404. Teeth 420 are similar to teeth 34 of rack 26. Accordingly, it will be appreciated that bearings 404 engage teeth 420 to drive the sprocket in a manner similar to that of the previous embodiment with the major difference being that the bearings are now on the rack as opposed to being on the sprocket as in the previous embodiment. As shown in FIG. 16, sprocket 418 also defines an endless guide surface 422 similar to guide surface 62 of the previous embodiment for guidingly cooperating with endless surface 410 of the roller rack to maintain a predetermined degree of root clearance between the sprocket's teeth 420 and the roller rack's bearings as they engage one another.

Those skilled in the relevant art will appreciate that while roller rack 402 is conceptually similar to rack 26, it has several advantages over rack 26. One, it is much more compact since the bearings are arranged in a straight line rather than the racetrack-shape path of the teeth of rack 26. Two, at the end of the downstroke and return stroke, roller rack 402 simply rolls on its respective outer bearing 404 to get into position for the next stroke. In contrast, rack 26 must travel through three teeth 34 at the ends of the rack before it is into position for the next stroke. Three, a bicyclist is much less likely to get clothing or other items caught in bearings 404 of rack 402 than in teeth 34 of rack 26.

As also shown in FIGS. 16 through 22, drive apparatus 400 employs a unique means for maintaining the bearings of roller rack 402 engaged with the teeth of sprocket 418. This means includes a sprocket housing 424 for housing sprocket 418 and defining spaced front and back parallel support plates 426, 428 which are sufficiently spaced from each other to permit movement of roller rack 402 through the housing. In addition, front support plate 426 defines a first inner endless groove 430 which partially receives a first ball bearing 432 which is also received in groove 412 of side plate 409. Similarly, back support plate 428 defines a second inner endless groove 434 which partially receives a second ball bearing 436 which is also received in the other groove 412 of the roller rack on the other side plate 408 of the rack. As will be appreciated, ball bearings 432, 436 received in first and second inner grooves 430, 434 and grooves 412 of side plates 409, 408 and the spacing between front and back plates 426, 428 all cooperate to maintain the bearings of roller rack 402 engaged with the teeth of sprocket 418 as they engage each other to rotate sprocket 418. As part of this cooperation, the first and second inner endless grooves 430, 434 are located so that they directly oppose each other which permits the first and second ball bearings 432,436 (which are preferably the same size) to revolve about the rotational axis of sprocket 428 in unison.

In view of the foregoing, it will be appreciated that ball bearings 432, 436 replace pin 66 of the previous embodiment of FIGS. 1–11 and that front and back plates 426, 428 with endless grooves 430, 434 replace rotating disc 64 of the previous embodiment. It will also be appreciated that there is no need for anything to rotate in this embodiment since endless grooves 430, 434 enable ball bearings 432,436 to revolve around the sprocket's rotational axis just like pin 66 revolves around sprocket 44's rotational axis which is all that is required.

In addition and as previously mentioned, grooves 412 (which also receive the ball bearings) replace slot 38 of the previous embodiment of FIGS. 1–11. Accordingly, it will be appreciated that during pedaling of the apparatus which is the same as that described in the previous embodiment, roller rack 402 and ball bearings 432, 436 move around the rotational axis of sprocket 418 the same way that rack 26 and pin 66 move around the rotational axis of sprocket 44, as such is shown in the various views of FIG. 6. FIGS. 18 and 21 show the present embodiment in the same position the previous embodiment is shown in view 5 of FIG. 6. Similarly, FIGS. 17 and 20 show the present embodiment in the same position the previous embodiment is shown in view 3 of FIG. 6.

FIGS. 16 and 19 through 22 also illustrate that the front and back plates 426, 428 each define an outer endless groove 440 which receive and retainingly hold a plurality of ball bearings 442 which are preferably smaller than the first and second ball bearings 432, 436. As will be appreciated, bearings 442 serve to prevent roller rack 402 from contacting or rubbing against the front and back support plates 426, 428 as the roller rack moves through the sprocket's housing 424. It is also believed that the provision of bearings 442 in one of the support plates 426, 428 may eliminate the need for the larger ball bearing in that support plate i.e. ball bearing 432 or 436. However, at least one large ball bearing 432 or 436 received in one of the support plates 428, 428 is believed to be necessary to maintain the roller rack engaged with the sprocket in this embodiment.

From the foregoing, those skilled in the art will appreciate that the drive apparatus embodiments of the present invention convert most of the energy imparted in making a downstroke with a bicycle pedal to rotary motion, thereby providing a drive system which enables the generation of much more power than that which is possible with a conventional bicycle drive system.

Those skilled in the internal combustion engine art will also appreciate that the rack component of the apparatus of the present invention can be easily attached to the piston head of a conventional internal combustion engine to drive the drive shaft of the engine, thereby replacing the conventional connecting rod/crankshaft system presently used in internal combustion systems. Other applications such as applications in pumps and in driving vehicle wheel axles are also considered to be within the spirit of the present invention.

The invention has been described in detail with reference to particular embodiments thereof, but it will be understood that various other modifications can be effected within the spirit and scope of this invention.

What is claimed:

1. A drive apparatus comprising:

rack means having a plurality of spaced first engagement members arranged single file in a first path;

sprocket means having a plurality of spaced second engagement members arranged single file in a second path for engaging said first engagement members to rotatingly drive said sprocket means when said rack means is driven and drive said rack means when said sprocket means is driven, at least one of said first and second engagement members having an outer surface defined by a member selected from the group consisting of cylindrical bearings and reduced friction material;

means for maintaining a predetermined degree of root clearance between said first and second engagement members; and, rack engagement means for maintaining engagement of said rack means with said sprocket means as said first and second engagement members engage each other.

2. An apparatus as claimed in claim 1 wherein said means for maintaining a predetermined degree of root clearance between said first and second engagement members includes a guide surface defined by said rack means which runs parallel to said first path and an endless surface which is parallel to the second path of said sprocket means for guidingly cooperating with said guide surface to maintain a predetermined degree of root clearance between said first and second engagement members.

3. An apparatus as claimed in claim 1 wherein when rack means is stationary and said sprocket means is driven to drive said rack means, said sprocket means is propelled along said rack means.

4. A drive apparatus as claimed in claim 1 wherein said plurality of spaced first engagement members arranged single file in a first path is a plurality of cylindrical bearings arranged linearly but side by side with respect to each other so that all of the bearings' axes of rotation are parallel to each other.

5. A drive apparatus as claimed in claim 1 wherein the first path of said rack means is serpentine.

6. A drive apparatus as claimed in claim 1 wherein said cylindrical bearings are roller bearings.

7. A drive apparatus as claimed in claim 1 wherein said cylindrical bearings are sleeve bearings.

8. A drive apparatus as claimed in claim 6 wherein said sleeve bearings are Teflon sleeve bearings.

9. A drive apparatus comprising as claimed in claim 1 wherein said sprocket means is rigidly attached to a member selected from the group consisting of a bicycle axle, an internal combustion engine drive shaft, a driving axle for driving a wheel and a drive shaft for a pump.

10. A drive apparatus comprising:
   rack means having a plurality of spaced first engagement members arranged single file in a first path, said rack means further defining a central guide slot means having opposing inwardly facing surfaces which are parallel to the first path;
   sprocket means having a plurality of spaced second engagement members arranged single file in an endless second path for engaging said first engagement members to rotatingly drive said sprocket means when said rack means is driven and drive said rack means when said sprocket means is driven, at least one of said first and second engagement members having an outer surface defined by a member selected from the group consisting of cylindrical bearings and reduced friction material; and
   rack engagement means for maintaining engagement of said rack means with said sprocket means, said rack engagement means having revolving engagement means for revolving about the rotational axis of said sprocket means and being received within said central guide slot means of said rack means so that said revolving engagement means moves within said slot means as it revolves about the sprocket means' rotational axis to maintain engagement of said rack means with said sprocket means as said first and second engagement members thereof engage each other; and,
   means for maintaining a predetermined degree of root clearance between said rack and sprocket engagement members.

11. A drive apparatus as claimed in claim 10 wherein said rack engagement means is independently rotatable about the rotational axis of said sprocket means and wherein said revolving engagement means includes cylindrical pin means for revolving about the rotational axis and being received within said central guide slot means of said rack means so that said pin means moves along the surface of said slot means as it revolves about the rotational axis to maintain engagement of said rack means with said sprocket means as said first and second engagement members thereof engage each other.

12. A drive apparatus as claimed in claim 10 wherein said rack means includes:
   a plurality of cylindrical bearings arranged linearly but side by side with respect to each other so that all of the bearings' axes of rotation are parallel to each other to enable said bearings to engage said second engagement members of said sprocket means to drive said sprocket means;
   bearing support means for supporting said bearings so that they are capable of rotating about their axes of rotation, said bearing support means including a pair of parallel side plates with said bearings being positioned between said side plates such that their axes of rotation are perpendicular to the direction in which said parallel side plates extend, at least one of said parallel side plates defining said central slot means wherein said slot means is a groove defined in the outwardly facing side surface of said parallel side plate; and
   said rack engagement means includes:
   a ball bearing; and
   a sprocket housing for receiving said sprocket means and defining spaced front and back parallel support plates which are sufficiently spaced from each other to permit movement of said rack means through said housing, at least one of said front and back support plates defining an inner endless groove which receives said ball bearing which is also received in said groove of said rack means' side plate to maintain engagement of said rack means with said sprocket means as said cylindrical bearings and second engagement members of said sprocket means engage each other, the other of said support plates defining means for maintaining said rack means against said ball bearing so that said ball bearing remains received in said endless groove and said groove of said rack means to maintain said rack means engaged with said sprocket means.

13. A drive apparatus as claimed in claim 10 wherein said rack means includes:
   a plurality of cylindrical bearings arranged linearly but side by side with respect to each other so that all of the bearings' axes of rotation are parallel to each other to enable said bearings to engage said second engagement members of said sprocket means to drive said sprocket means;
   bearing support means for supporting said bearings so that they are capable of rotating about their axes of rotation, said bearing support means including a pair of parallel side plates, each of which has an outwardly facing side surface and a plurality of support posts rigidly connecting said parallel side plates together, said cylindrical bearings being mounted upon said support posts and being positioned between said side plates such that their axes of rotation are perpendicular to the direction in which said parallel side plates extend, each of said parallel side plates defining said central slot means wherein said slot means is a groove defined in the outwardly facing side surface of each parallel side plate; and
   said rack engagement means includes:
   first and second ball bearings; and
   a sprocket housing for housing said sprocket means and defining spaced front and back parallel support plates which are sufficiently spaced from each other to permit movement of said rack means through said housing, said front support plate defining a first inner endless groove which receives said first ball bearing which is also received in one of said grooves of said rack means' side plates to maintain engagement of said rack means with said sprocket means as said first and second engagement members thereof engage each other, said back support plate defining a second inner endless groove which receives said second ball bearing which is also received in the other groove of said rack means' side plates to maintain engagement of said rack means with said sprocket means as said first and second engagement members thereof engage each other, said first and second inner endless grooves opposing each other so that said first and second ball bearings revolve about the rotational axis of said sprocket means in unison, said ball bearings, said first and second inner endless grooves and said side plate grooves receiving said ball bearings and the spacing between said front and back plates all cooperating to maintain said bearings of said rack means engaged with said second engagement members of said sprocket means as they engage each other to rotate said sprocket means.

14. A drive apparatus as claimed in claim 13 wherein at least on of said front and back support plate further comprises an outer endless groove for receiving a plurality of ball bearings which are smaller than said first and second ball bearings which prevent contact of said rack means with said support plates as said rack means moves through said sprocket housing.

15. A method of rotatingly driving a sprocket comprising:
providing a drive apparatus including:
a rack having a plurality of spaced first engagement members arranged single file in a first path;
a sprocket having a plurality of spaced second engagement members arranged single file in a second path for engaging the first engagement members to rotatingly drive the sprocket when the rack is driven, at least one of the first and second engagement members having an outer surface defined by a member selected from the group consisting of cylindrical bearings and reduced friction material;
rack engagement means for maintaining engagement of said rack with said sprocket as said rack and sprocket engagement members engage each other; and,
means for maintaining a predetermined degree of root clearance between said rack and sprocket engagement members;
moving the rack as far as it can be moved in a first predetermined direction to rotate the sprocket in a desired clockwise or counter-clockwise direction; and then
moving the rack as far as it can be moved in a generally opposite second predetermined direction to continue rotating the sprocket in the desired direction and to make it possible to move the rack in the first predetermined direction again to continue rotation of the sprocket in the desired direction wherein when the rack moves in the first pre-determined direction it follows a path taken along half of a racetrack shape as measured along the longitudinal section of the racetrack shape and when the rack moves in the second generally opposite pre-determined direction it follows a path taken along the other half of the racetrack shape.

16. A drive apparatus comprising:
sprocket means having a plurality of sprocket engagement members arranged single file in an endless path;
rack means having a plurality of rack engagement members arranged single file in a straight path wherein each rack engagement member is engagable from opposite sides of said straight path for engaging said sprocket engagement members to rotatingly drive said sprocket means when said rack means is driven and drive said rack means when said sprocket means is driven;
rack engagement means for maintaining engagement of said rack means with said sprocket means as said rack and sprocket engagement members engage each other; and,
means for maintaining a predetermined degree of root clearance between said rack and sprocket engagement members.

17. An apparatus as claimed in claim 16 further comprising means for maintaining a predetermined degree of root clearance between said rack and sprocket engagement members.

18. An apparatus as claimed in claim 17 wherein said means for maintaining a predetermined degree of root clearance between said rack and sprocket engagement members includes a guide surface defined by said rack means which runs parallel to the straight path and an endless surface defined by said sprocket means which is parallel to the endless path of said sprocket means for guidingly cooperating with said guide surface to maintain a predetermined degree of root clearance between said rack and sprocket engagement members.

19. An apparatus as claimed in claim 16 further comprising rack engagement means for maintaining engagement of said rack means with said sprocket means as said rack and sprocket engagement members engage each other.

20. A drive apparatus as claimed in claim 16 wherein at least one of said rack engagement members includes a cylindrical bearing.

21. A drive apparatus as claimed in claim 16 wherein said plurality of rack engagement members arranged single file in a straight path includes a plurality of cylindrical bearings arranged linearly but side by side with respect to each other so that all of the bearings' axes of rotation are parallel to each other.

22. A drive apparatus as claimed in claim 21 wherein said cylindrical bearings are roller bearings.

23. A drive apparatus as claimed in claim 21 wherein said cylindrical bearings are sleeve bearings.

24. A method of rotatingly driving a sprocket comprising:
providing a drive apparatus including:
a sprocket having a plurality of sprocket engagement members arranged single file in an endless path;
a rack having a plurality of rack engagement members arranged single file in a straight path wherein each rack engagement member is engagable from opposite sides of the straight path for engaging the sprocket engagement members to rotatingly drive the sprocket when the rack is driven;
rack engagement means for maintaining engagement of said rack with said sprocket as said rack and sprocket engagement members engage each other; and,
means for maintaining a predetermined degree of root clearance between said rack and sprocket engagement members;
driving the rack as far as it can be driven in a first predetermined direction to rotate the sprocket in a desired clockwise or counter-clockwise direction; and then
driving the rack as far as it can be driven in a generally opposite second predetermined direction to continue rotating the sprocket in the desired direction and to make it possible to drive the rack in the first predetermined direction again to continue rotation of the sprocket in the desired direction wherein when the rack is driven in the first pre-determined direction it follows a path taken along half of a racetrack shape as measured along the longitudinal section of the racetrack shape and when the rack is driven in the second generally opposite pre-determined direction it follows a path taken along the other half of the racetrack shape.

* * * * *